(12) United States Patent
Ryu et al.

(10) Patent No.: US 11,989,448 B2
(45) Date of Patent: May 21, 2024

(54) MEMORY CONTROLLER AND MEMORY SYSTEM INCLUDING THE SAME

(71) Applicant: SK hynix Inc., Gyeonggi-do (KR)

(72) Inventors: Jun Hee Ryu, Gyeonggi-do (KR); Kwang Jin Ko, Gyeonggi-do (KR); Chang Hyun Park, Gyeonggi-do (KR); Young Pyo Joo, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 17/888,965

(22) Filed: Aug. 16, 2022

(65) Prior Publication Data

US 2023/0305743 A1 Sep. 28, 2023

(30) Foreign Application Priority Data

Mar. 25, 2022 (KR) .................. 10-2022-0037657

(51) Int. Cl.
*G06F 12/00* (2006.01)
*G06F 3/06* (2006.01)

(52) U.S. Cl.
CPC ............ *G06F 3/0658* (2013.01); *G06F 3/061* (2013.01); *G06F 3/0653* (2013.01); *G06F 3/0683* (2013.01)

(58) Field of Classification Search
CPC ...... G06F 3/0658; G06F 3/061; G06F 3/0653; G06F 3/0683

USPC ........................................................ 711/154
See application file for complete search history.

(56) References Cited

U.S. PATENT DOCUMENTS 10,854,290 B1 12/2020 Wu et al.

FOREIGN PATENT DOCUMENTS

| JP | 2022159991 | * | 2/2022 |
| KR | 10-2113212 B1 | | 5/2020 |
| KR | 10-2021-0025344 A | | 3/2021 |
| KR | 20220039404 A | * | 3/2022 |

* cited by examiner

*Primary Examiner* — Mardochee Chery
(74) *Attorney, Agent, or Firm* — IP & T GROUP LLP

(57) ABSTRACT

Provided herein may be a memory controller and a memory system including the same. The memory controller includes a scanning period controller configured to reset, whenever scanning points sequentially arrive, access information indicating whether each of a plurality of pages is accessed, and set a scanning interval for each of the pages between the scanning points for the page based on an attribute of the page, an attribute determiner configured to determine, as a hot page or a cold page, the attribute of each of the pages based on an access interval for the page from the first scanning point among the scanning points for the page to time at which access to data stored in the page is requested, and a memory allocator configured to control first and second memory devices based on the attributes of the pages.

20 Claims, 12 Drawing Sheets

| Req  | pg_inf | ps_bit | scan_p1 | scan_p2 | scan_intv | accs_p |
|------|--------|--------|---------|---------|-----------|--------|
| Req1 | 1      | 0      | 3       | 13      | 10        | 5      |
| Req2 | 2      | 0      | 3       | 13      | 10        | 9      |
| Req3 | 3      | 0      | 3       | 13      | 10        | 18     |
| Req4 | 4      | 0      | 3       | 13      | 10        | 8      |
| Req5 | 5      | 0      | 3       | 13      | 10        | 11     |
| ⋮    | ⋮      | ⋮      | ⋮       | ⋮       | ⋮         | ⋮      |

| pg_inf | scan_p1 | accs_p | ac_intv | th_intv | h/c_inf |
|---|---|---|---|---|---|
| 1 | 3 | 5 | 2 | 5 | 1 |
| 2 | 3 | 9 | 6 | 5 | 0 |
| 3 | 3 | 18 | 15 | 5 | 0 |
| 4 | 3 | 8 | 5 | 5 | 1 |
| 5 | 3 | 11 | 8 | 5 | 0 |
| ⋮ | ⋮ | ⋮ | ⋮ | ⋮ | ⋮ |

| Req | pg_inf | ps_bit | scan_p1 | scan_p2 | scan_intv | ac_intv |
|---|---|---|---|---|---|---|
| Req1 | 1 | 0 | 3 | 7 | 4 | 2 |
| Req2 | 2 | 0 | 3 | 11 | 8 | 6 |
| Req3 | 3 | 0 | 3 | 16 | 13 | 15 |
| Req4 | 4 | 0 | 3 | 7 | 4 | 5 |
| Req5 | 5 | 0 | 3 | 11 | 8 | 8 |
| ⋮ | ⋮ | ⋮ | ⋮ | ⋮ | ⋮ | ⋮ |

MEMORY CONTROLLER AND MEMORY SYSTEM INCLUDING THE SAME

CROSS-REFERENCE TO RELATED APPLICATION

The present application claims priority under 35 U.S.C. § 119(a) to Korean patent application number 10-2022-0037657, filed on Mar. 25, 2022, the entire disclosure of which is incorporated herein by reference.

BACKGROUND

Field of Invention

Various embodiments of the present disclosure relate to an electronic device, and more particularly to a memory controller and a memory system including the memory controller.

Description of Related Art

A heterogeneous memory system is a system including memory devices having different operation speeds. In detail, a heterogeneous memory system is composed of memory having a relatively high operation speed and memory having a relatively low operation speed. Generally, a memory device having a high operation speed has a smaller storage capacity, whereas a memory device having a low operation speed has a larger storage capacity. Accordingly, to improve the performance of a heterogeneous memory system having a limited storage capacity, there is a need to store hot data more frequently requested by a host in a memory device having a high operation speed and to store cold data less frequently requested by the host in a memory device having a low operation speed. Therefore, it may be important to accurately check whether an attribute of data requested by a host indicates hot data or cold data.

SUMMARY

Various embodiments of the present disclosure are directed to a memory controller that is capable of improving a hot page detection speed and a memory system including the memory controller.

An embodiment of the present disclosure may provide for a memory controller for controlling heterogeneous first and second memory device and each configured to include a plurality of pages. The memory controller may include a scanning period controller configured to reset, whenever scanning points sequentially arrive, access information indicating whether each of the plurality of pages is accessed, and set a scanning interval for each of the pages between the scanning points for the page based on an attribute of the plurality of pages, an attribute determiner configured to determine, as a hot page or a cold page, the attribute of each of the pages based on an access interval for the page from a first scanning point among the scanning points for the page to a time at which access to data stored in the page is requested, and a memory allocator configured to control the first memory device and the second memory device based on the attributes of the plurality of pages.

An embodiment of the present disclosure may provide for a method of operating a memory controller. The method may include updating access information at each of a plurality of scanning points, the access information indicating whether each of a plurality of pages in each of a heterogeneous first memory device and a second memory device is accessed, setting a scanning interval for each of the plurality of pages between the plurality of scanning points for the page based on the access information for the page, determining an attribute of each of the plurality of pages in response to a request to access data stored in the page, and controlling the first memory device and the second memory device based on the attributes of the plurality of pages.

An embodiment of the present disclosure may provide for a memory system. The memory system may include a first memory, a second memory having an operation speed higher than an operation speed of the first memory and having a type different from a type of the first memory, and a memory controller configured to determine an attribute of each of a plurality of pages as a hot page or a cold page, included in each of the first memory and the second memory based on an access interval for the page from a time at which a scanning point is set for the page to a time at which access to data stored in the page is requested, set a length of a scanning interval for the page from the scanning point for the page to a subsequent scanning point for the page depending on a length of the access interval for the page, and control the first memory and the second memory to store data of the plurality of pages in the first memory or the second memory depending on the attributes of the plurality of pages.

An embodiment of the present disclosure may provide for a method of operating a controller. The method may include resetting information, which represents whether a page is accessed, repeatedly with a scanning interval defining scanning points, and adjusting the scanning interval in proportion to an access interval, wherein the information is reset at each of the scanning points, and wherein the access interval is from the scanning point to when an access to the page is requested.

An embodiment of the present disclosure may provide for a method of operating a controller. The method may include resetting information, which represents whether a page is accessed within a first memory device, repeatedly at each scanning point, and moving data from the page into a second memory device when an access interval is shorter than a threshold, wherein the access interval is from the scanning point to when an access to the page is requested.

An embodiment of the present disclosure may provide for a method of operating a controller. The method may include resetting information, which represents whether a page is accessed within a first memory device, repeatedly at each scanning point, and moving data from the page into a second memory device when an access interval is longer than a threshold, wherein the access interval is from the scanning point to when an access to the page is requested.

BRIEF DESCRIPTION OF THE DRAWINGS

FIG. 4 is a diagram illustrating a scanning period controller and a page information storage according to an embodiment of the present disclosure.

FIG. 5 is a diagram illustrating attribute information of a plurality of pages generated by an attribute determiner according to an embodiment of the present disclosure.

FIG. 7 is a diagram illustrating an operation of changing scanning intervals depending on the access intervals for a plurality of pages according to an embodiment of the present disclosure.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification.

Figure 1:
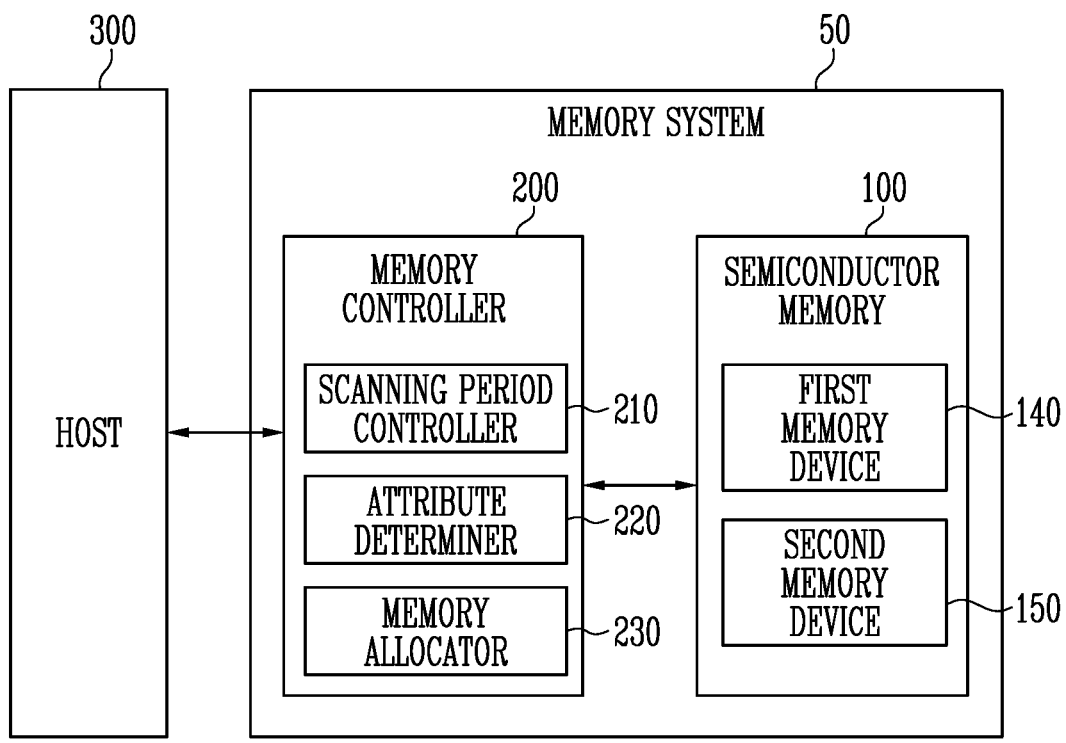
FIG. 1 is a diagram illustrating a memory system according to an embodiment of the present disclosure.

FIG. 1 is a diagram illustrating a memory system according to an embodiment of the present disclosure.

Referring to FIG. 1, a memory system 50 may include a semiconductor memory 100 and a memory controller 200 which controls the operation of the semiconductor memory 100. The memory system 50 may be a device which stores data under the control of a host 300, such as a mobile phone, a smartphone, an MP3 player, a laptop computer, a desktop computer, a game console, a TV, a tablet PC, or an in-vehicle infotainment system.

The memory system 50 may be manufactured as any of various types of storage devices depending on a host interface that is a scheme for communication with the host 300. For example, the memory system 50 may be implemented as any of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-e or PCIe) card-type storage device, a compact flash (CF) card, a smart media card, and a memory stick.

The memory system 50 may be manufactured in any of various types of package forms. For example, the memory system 50 may be manufactured in any of various types of package forms, such as package on package (POP), system in package (SIP), system on chip (SOC), multi-chip package (MCP), chip on board (COB), wafer-level fabricated package (WFP), and wafer-level stack package (WSP).

The semiconductor memory 100 may store data. The semiconductor memory 100 may be operated under the control of the memory controller 200.

In an embodiment, the semiconductor memory 100 may be implemented as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change RAM (PRAM), a magnetoresistive RAM (MRAM), a ferroelectric RAM (FRAM), or a spin transfer torque RAM (STT-RAM).

The semiconductor memory 100 may include a first memory device 140 and a second memory device 150.

The first memory device 140 and the second memory device 150 may be different types of memory devices. That is, the first memory device 140 and the second memory device 150 may be heterogeneous memory devices. In detail, the second memory device 150 may be a memory device that responds to a request from the host 300 at a higher operation speed than the first memory device 140. The operation speed may include a write speed at which data is stored and a read speed at which stored data is read. In an embodiment, the first memory device 140 may be a nonvolatile memory device, and the second memory device 150 may be a volatile memory device. The nonvolatile memory device may be a flash memory, and the volatile memory device may be a dynamic random access memory (DRAM). In an embodiment, both the first memory device 140 and the second memory device 150 may be volatile memory devices. In an embodiment, both the first memory device 140 and the second memory device 150 may be nonvolatile memory devices. The first memory device 140 or the second memory device 150 may include a plurality of memory blocks. One memory block may include a plurality of pages. In an embodiment, one page may be the unit by which data is stored in the first memory device 140 or the second memory device 150, or the unit by which data stored in the first memory device 140 or the second memory device 150 is read.

Each of the first memory device 140 and the second memory device 150 may receive a command from the memory controller 200, and may access a selected area. Each of the first memory device 140 and the second memory device 150 may perform an operation indicated by the command on the selected area. For example, each of the first memory device 140 and the second memory device 150 may perform a write operation (i.e., a program operation), a read operation, and an erase operation. During a write operation, each of the first memory device 140 and the second memory device 150 may program data to a selected area. During a read operation, each of the first memory device 140 and the second memory device 150 may read data from a selected area. During an erase operation, each of the first memory device 140 and the second memory device 150 may erase data stored in a selected area. In an embodiment, each of the first memory device 140 and the second memory device 150 may include a plurality of memory chips.

The memory controller 200 may control the overall operation of the memory system 50. The memory controller 200 may control the first memory device 140 and the second memory device 150 so that a write operation, a read operation, or an erase operation is performed in response to a request received from the host 300. During a write operation, the memory controller 200 may provide a write command and data to the first memory device 140 or the second memory device 150. During a read operation, the memory controller 200 may provide a read command to the first memory device 140 or the second memory device 150. During an erase operation, the memory controller 200 may provide an erase command to the first memory device 140 or the second memory device 150.

In an embodiment, the memory controller 200 may include a scanning period controller 210, an attribute determiner 220, and a memory allocator 230.

The scanning period controller 210 may set scanning points for each of a plurality of pages included in the first memory device 140 and the second memory device 150. The scanning points may be time points at which access information indicating whether each of the pages is accessed is reset. The scanning points may be periodically set for each page. For example, the scanning points for each page may be set at respective scanning intervals for the page. Each scanning interval for each page may be an interval from the time at which the corresponding scanning point for the page is set to a subsequent scanning point for the page. In an embodiment, the scanning interval may be a preset interval. The scanning interval for each page may be set depending on the attribute of the page. In other embodiments, the scanning interval for each page may be changed depending on the interval from the time at which the corresponding scanning point for the page is set to the time at which access to data stored in the page is requested. For example, when a first scanning point for each page is set at a first time point for the page, a second scanning point for the page may be set at a second time point, which indicates the time elapsed since the first scanning point by the scanning interval.

The attribute determiner 220 may determine the attributes of a plurality of pages included in the first memory device 140 and the second memory device 150. The attributes of the plurality of pages may indicate any one of a hot page and a cold page. The attribute of each page may be determined based on an access interval of the page, which is an interval from the time at which the corresponding scanning point is set to the time at which access to the data stored in the plurality of pages is requested. The access interval for the plurality of pages may be an interval from the time at which the scanning point for the plurality of pages is set to the time at which access to the data stored in the plurality of pages is requested. For example, the attribute determiner 220 may determine the attribute of one of the plurality of pages to indicate a hot page when the access interval for the one page is shorter than or equal to a preset interval. The preset interval may be an interval from the time at which a scanning point for a page is set to a preset time. When access to data stored in a page is requested within the period from the time at which the scanning point for the page is set to the preset time, the attribute determiner 220 may determine the attribute of the page to indicate a hot page. In an example, when the access interval for a page is longer than the preset interval, the attribute determiner 220 may determine the attribute of the page to indicate a cold page. When access to data stored in a page is requested after the preset time has elapsed since the time at which the scanning point for the page was set, the attribute determiner 220 may determine the attribute of the page to indicate a cold page.

The memory allocator 230 may control the operation of each of the first memory device 140 and the second memory device 150. In an embodiment, the memory allocator 230 may control the first memory device 140 or the second memory device 150 so that data provided from the host 300 is stored in the first memory device 140 or the second memory device 150. In an embodiment, the memory allocator 230 may control the movement of data between the first memory device 140 and the second memory device 150. For example, when the attribute of a page including the data stored in the first memory device 140 indicates a hot page, the memory allocator 230 may control the first memory device 140 and the second memory device 150 so that data stored in the first memory device 140 is stored in the second memory device 150. In other examples, when the attribute of a page including the data stored in the second memory device 150 indicates a cold page, the memory allocator 230 may control the first memory device 140 and the second memory device 150 so that data stored in the second memory device 150 is stored in the first memory device 140.

In an embodiment, the scanning period controller 210 may change the time point at which a subsequent scanning point is to be set depending on the attributes of the plurality of pages. For example, the scanning period controller 210 may set a second scanning point at the time point after a preset time has elapsed since the time at which a first scanning point for a plurality of pages was set. However, the time point at which the second scanning point is set may be changed depending on respective attributes of the plurality of pages. Alternatively, the scanning interval may be changed depending on the access interval for each of the plurality of pages. For example, the access interval for one of the plurality of pages when the attribute of the one page indicates a hot page may be shorter than when the attribute of the one page indicates a cold page. Since the frequency of a request to access the data stored in the page having the attribute of a hot page is high, it may be profitable to store the data in the second memory device 150. Further, since the frequency of a request to access the data stored in the page having the attribute of a cold page is low, it may be profitable to store the data in the first memory device 140. That is, as an access interval for a page is shorter, it is profitable to store the page in the second memory device 150, and thus there may be a need to set the scanning interval in consideration of the length of a page access interval in order to detect the length of the page access interval. For example, as an access interval for a page is shorter, the scanning interval may be set to be shorter, and thus whether the attribute of the page indicates a hot page may be more accurately detected. In an example, as an access interval for a page is longer, the scanning interval may be set to be longer, and thus additional overhead on the memory system 50 that may occur due to the setting of unnecessary scanning points may be prevented.

The host 300 may communicate with the memory system 50 using at least one of various communication standards or interfaces such as universal serial bus (USB), Serial AT Attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
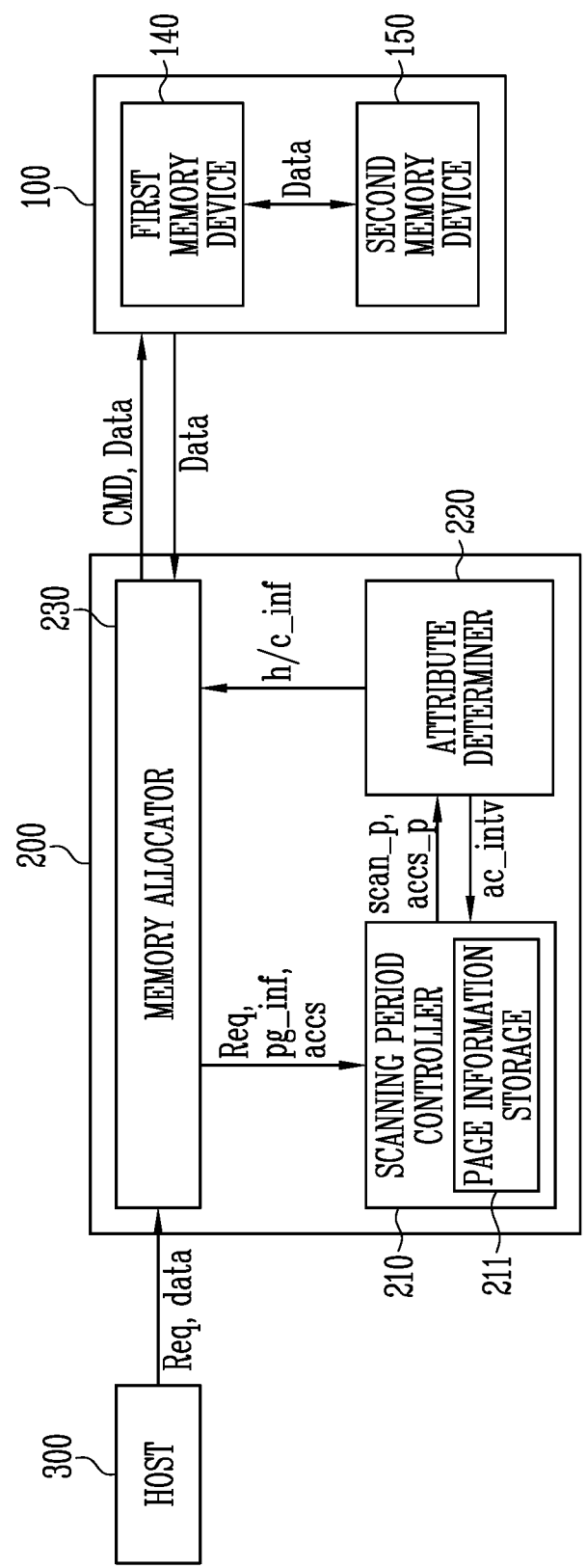
FIG. 2 is a diagram illustrating the operation of a memory system according to an embodiment of the present disclosure.

FIG. 2 is a diagram illustrating the operation of a memory system according to an embodiment of the present disclosure.

A semiconductor memory 100, a memory controller 200, and a host 300, which are illustrated in FIG. 2, may represent the semiconductor memory 100, the memory controller 200, and the host 300, respectively, which are illustrated in FIG. 1.

Referring to FIG. 2, the memory allocator 230 may receive a request Req and data from the host 300. The memory allocator 230 may provide both the command CMD and the data to the first memory device 140 or the second memory device 150 so that the data is stored in the first memory device 140 or the second memory device 150 in response to the request Req received from the host 300. Here, the memory allocator 230 may provide the scanning period controller 210 with the type of request Req provided by the host and information pg_inf about a page in which the data is stored.

Thereafter, the memory allocator 230 may receive the request to access the data stored in the first memory device 140 and the second memory device 150 from the host 300. The request Req from the host may be a request to read the data. Here, the memory allocator 230 may refer to a page information storage 211 included in the scanning period controller 210 to obtain the information pg_inf about the page in which the data is stored. The memory allocator 230 may provide the scanning period controller 210 with an access signal accs for checking a page in which data corresponding to the request from the host is stored. Thereafter, the memory allocator 230 may be provided with the data from the first memory device 140 or the second memory device 150, and may provide the data to the host 300.

The scanning period controller 210 may set scanning points for each page. Each of the scanning points for the page may be the time point of a bit value indicating that data stored in the page cannot be accessed is set. The scanning period controller 210 may be provided with the access signal accs from the memory allocator 230, and may then determine whether a scanning point is set for the page in which data corresponding to the request from the host is stored. When it is determined that the scanning point is set in the page in which the data corresponding to the request from the host is stored, the scanning period controller 210 may incur a page fault indicating that the corresponding data cannot be accessed. Thereafter, the scanning period controller 210 may control the page information storage 211 to store information accs_p about the time at which access to the page in which the page fault has been incurred is made in response to the access signal accs from the memory allocator 230.

The scanning period controller 210 may set a first scanning point, and may thereafter set a second scanning point. An interval from the time at which the first scanning point is set to the second scanning point may be a scanning interval. The scanning period controller 210 may periodically set the scanning interval. The scanning period controller 210 may set the scanning points, and may then provide information scan_p about the scanning points to the attribute determiner 220. Also, the scanning period controller 210 may provide the information accs_p about the page access time to the attribute determiner 220. In an embodiment, the scanning period controller 210 may set the scanning interval based on information ac_intv about a page access interval provided from the attribute determiner 220. More specifically, the scanning period controller 210 may change the scanning interval depending on the page access interval.

The scanning period controller 210 may include the page information storage 211. The page information storage 211 may store information about a page corresponding to a request provided from the host. The page information pg_inf may be information about the location of the page in which data corresponding to the request from the host is stored. The scanning period controller 210 may store information accs_p about a page access time.

The attribute determiner 220 may determine the attributes of the plurality of pages based on the information scan_p about the scanning points and the information accs_p about the page access time. In an embodiment, the attribute determiner 220 may determine an access interval for each of the plurality of pages based on the information scan_p about the scanning points and the information accs_p about the page access time. The access interval may be an interval from the time at which the first scanning point is set to the time at which access to the data stored in the plurality of pages is requested. The attribute determiner 220 may determine the attribute of each of the plurality of pages to be any one of a hot page and a cold page depending on the length of the access interval. Thereafter, the attribute determiner 220 may provide information about the attributes h/c_inf of the plurality of pages to the memory allocator 230. Also, the attribute determiner 220 may provide the information ac_intv about the access intervals for the plurality of pages to the scanning period controller 210.

The memory allocator 230 may control the movement of data between the first memory device 140 and the second memory device 150 based on the information about the attributes h/c_inf of the plurality of pages. In an embodiment, the memory allocator 230 may control the first memory device 140 and the second memory device 150 so that, when the attribute of a page in which data is stored indicates a hot page and the data is stored in the first memory device 140, the data is stored in the second memory device 150. In an embodiment, after the data stored in the first memory device 140 is read by the memory allocator 230, the data may be stored in the second memory device 150. For example, the memory allocator 230 may control the first memory device 140 and the second memory device 150 so that the data stored in the first memory device 140 is read, errors in the read data are corrected, and error-corrected data is then stored in the second memory device 150. In an embodiment, the memory allocator 230 may control the first memory device 140 and the second memory device 150 so that, when the attribute of a page in which data is stored indicates a cold page and the data is stored in the second memory device 150, the data is stored in the first memory device 140. In an embodiment, after the data stored in the second memory device 150 is read by the memory allocator 230, the data may be stored in the first memory device 140. For example, the memory allocator 230 may control the first memory device 140 and the second memory device 150 so that the data stored in the second memory device 150 is read, errors in the read data are corrected, and error-corrected data is then stored in the first memory device 140.

Figure 3:
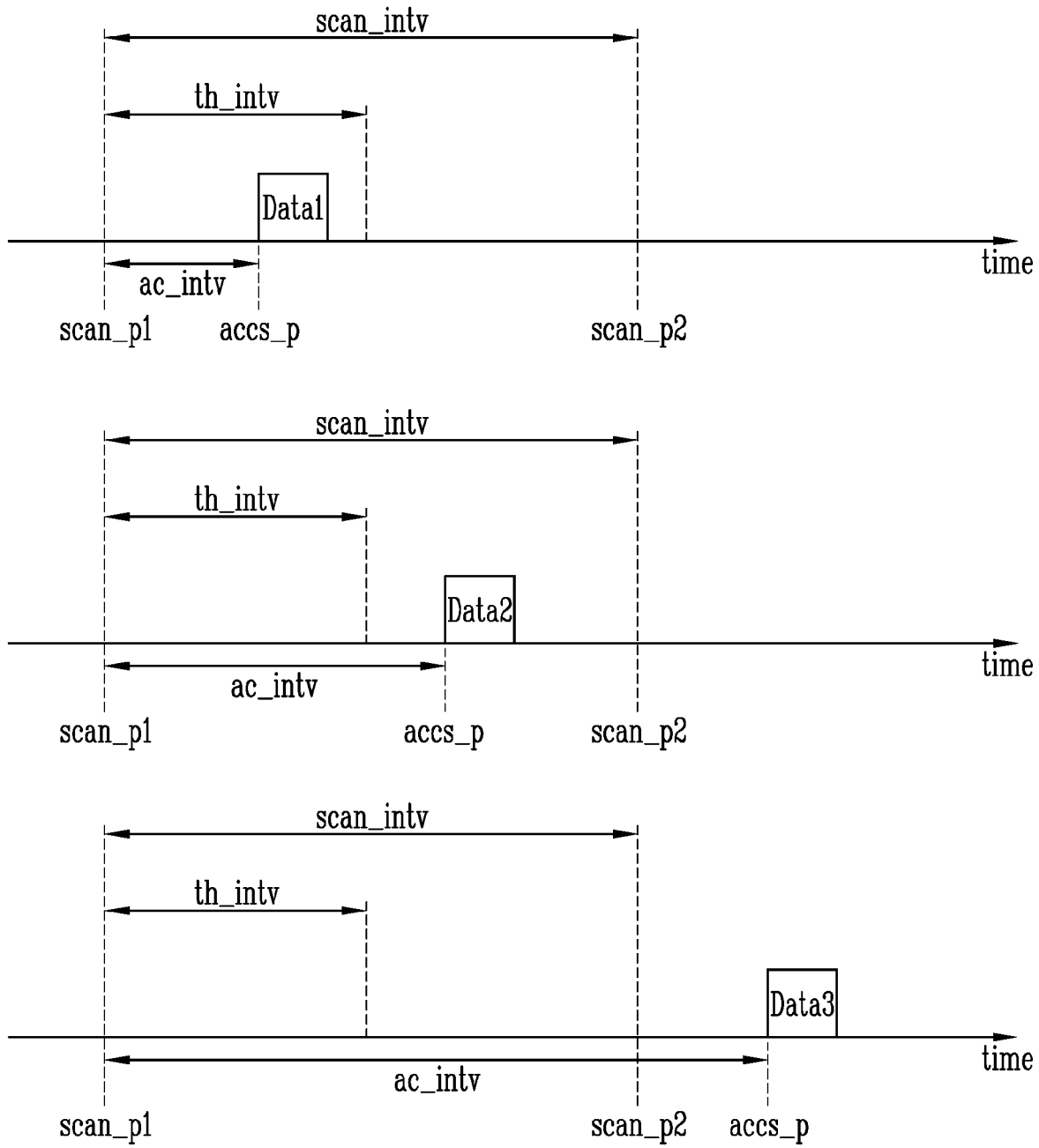
FIG. 3 is a diagram illustrating an operation of determining the attributes of a plurality of pages depending on the scanning interval according to an embodiment of the present disclosure.

FIG. 3 is a diagram illustrating an operation of determining the attributes of a plurality of pages depending on the scanning interval according to an embodiment of the present disclosure.

In FIG. 3, the horizontal axis of each graph indicates time.

Referring to FIG. 3, the attribute determiner 220 of FIG. 2 may determine the attributes of a plurality of pages by comparing an access interval ac_intv with a preset interval th_intv. The access interval ac_intv may be determined based on the time at which a first scanning point scan_p1 is set and the time accs_p at which access to data is requested. More specifically, the access interval ac_intv may be determined to be an interval from the time at which the first scanning point scan p1 is set to the time accs p at which access to data is requested.

Further, a scanning interval scan_intv may be an interval from the time at which the first scanning point scan_p1 is set to the time at which a second scanning point scan_p2 is set. In FIG. 3, a description is made based on the scanning interval scan_intv being a preset interval. When the scanning interval scan_intv is the preset interval, the second scanning point scan_p2 may be set such that all scanning intervals scan_intv for the plurality of pages are equal to each other.

The graph in the upper portion of FIG. 3 shows the case where an access interval ac_intv for first data Data1 is shorter than a preset interval th_intv. That is, when the access interval ac_intv for the first data Data1 is shorter than or equal to the preset interval th_intv, the attribute of a page in which the first data Data1 is stored may be determined to indicate a hot page. Alternatively, since access to the first data Data1 is requested within a preset period from the time at which the first scanning point scan_p1 is set, the attribute of the page in which the first data Data1 is stored may be determined to indicate a hot page.

The graph in the middle portion of FIG. 3 shows the case where an access interval ac_intv for second data Data2 is longer than the preset interval th_intv and is shorter than the scanning interval scan_intv. That is, when the access interval ac_intv for the second data Data2 is longer than the preset interval th_intv, the attribute of a page in which the second data Data2 is stored may be determined to indicate a cold page. Alternatively, since access to the second data Data2 is requested after a preset period has elapsed since the time at which the first scanning point scan_p1 was set, the attribute of the page in which the second data Data2 is stored may be determined to indicate a cold page.

The graph in the lower portion of FIG. 3 shows the case where an access interval ac_intv for third data Data3 is longer than the preset interval th_intv and the scanning interval scan_intv. That is, similar to the middle graph of FIG. 3, the graph in the lower portion of FIG. 3 shows that the access interval ac_intv for data is longer than the preset interval th_intv, and thus the attribute of a page in which the third data Data3 is stored may be determined to indicate a cold page. Since the access intervals ac_intv for the second data Data2 and the third data Data3 are different from each other, the frequency with which access to data is to be subsequently requested may differ. Since the access interval ac_intv for the second data Data2 is shorter than the access interval ac_intv for the third data Data3, there is a strong possibility that the frequency with which access to the second data Data2 is to be subsequently requested will be higher than the third data Data3. The possibility that the page in which the second data Data2 is stored will have the attribute of a hot page due to subsequent access requests may be higher than that of the page in which the third data Data3 is stored. That is, among pieces of data stored in cold pages, data having a shorter access interval ac_intv may have a stronger possibility of having the attribute of a hot page due to subsequent access requests. Further, among pieces of data stored in cold pages, data having a longer access interval ac_intv may have a stronger possibility of continuing to have the attribute of a cold page in spite of subsequent access requests. Accordingly, in order to exactly detect the attributes of pages, which are changeable depending on access requests, there may be a need to change the scanning interval scan_intv.

FIG. 4 is a diagram illustrating a scanning period controller and a page information storage according to an embodiment of the present disclosure.

Referring to FIG. 4, the page information storage 211 illustrated in FIG. 2 may store information pg_inf about pages corresponding to requests Req from a host, an access bit ps_bit for a plurality of pages, first scanning points scan_p1 for the plurality of pages, second scanning points scan_p2 for the plurality of pages, scanning intervals scan_intv, and information about time accs_p at which access to the data stored in the plurality of pages is requested.

The page information storage 211 may store the information pg_inf about a page in which data corresponding to each request Req from the host is stored. The information pg_inf about the page in which the data is stored may be information indicating the absolute position or the sequential position of the corresponding page. The access bit ps_bit may be a bit indicating whether the page in which data is stored is accessed. In an embodiment, when the access bit ps_bit is '0', the page in which data is stored may not be accessed. In an embodiment, when the access bit ps_bit is '1', the page in which data is stored may be accessed. The access bit ps_bit may be reset when scanning points are set. In an example, the access bit ps_bit may be set to '0' when scanning points are set. In an example, when an access signal is received from the memory allocator 230, the access bit ps_bit may be set to '1'. In FIG. 4, a description is made based on that the scanning points are set at the same time point for first to fifth pages. For example, the scanning period controller 210 may set the first scanning point at the time point of 3 for each of the first to fifth pages. Further, when the scanning interval scan_intv is 10, the time at which the second scanning point scan_p2 is to be set by the scanning period controller 210 may be 13. That is, when the scanning interval scan_intv is a preset interval, the second scanning points scan_p2 for the first to fifth pages may be set at the same time point.

The scanning period controller 210 may store information about the time accs_p at which access to the data stored in a page is requested in the page information storage 211. The times at which accesses to pieces of data stored in the plurality of pages are requested (i.e., data access request time) may be different from each other. For example, the time at which access to data stored in the first page is requested may be 5, and the time at which access to data stored in the second page is requested may be 9. Thereafter, the scanning period controller 210 may provide information about the time at which the first scanning point scan_p1 is set and the time accs_p at which access to data is requested to the attribute determiner 220.

FIG. 5 is a diagram illustrating attribute information of a plurality of pages generated by an attribute determiner according to an embodiment of the present disclosure.

Referring to FIG. 5, the attribute determiner 220 may determine access intervals for a plurality of pages (page access interval) based on a first scanning point and the time at which access to data is requested. The attribute determiner 220 may determine the attribute of each of the plurality of pages to indicate a hot page or a cold page based on the access intervals for the pages.

First, the case where access to data stored in a first page is requested in the table shown in FIG. 5 is described by way of example. The attribute determiner 220 may receive, from the scanning period controller 210, information about the time at which a first scanning point scan_p1 for the first page is set and information about the time accs_p at which access to data stored in the first page is requested. The attribute determiner 220 may determine the access interval ac_intv for the first page to be 2 because the time at which the first scanning point scan_p1 is set is 3 and the time accs_p at which access to data is requested is 5. Also, the attribute determiner 220 may determine the attribute h/c_inf of the first page by comparing the first page access interval ac_intv with a preset interval th_intv. The preset interval th_intv may be a reference interval for determining the attributes of the plurality of pages. The attribute determiner 220 may determine the attribute h/c_inf of the first page to indicate a hot page because the first page access interval ac_intv is shorter than the preset interval th_intv. The hot page may be represented by a logical value of "1."

In an example, when access to data stored in a third page is requested, the attribute determiner 220 may determine an access interval ac_intv for the third page to be 15 because the time at which the first scanning point scan_p1 is set is 3 and the time accs_p at which access to the data is requested is 18. Further, the attribute determiner 220 may determine the attribute h/c_inf of the third page by comparing the third page access interval ac_intv with the preset interval th_intv. The attribute determiner 220 may determine the attribute h/c_inf of the first page to indicate a cold page because the third page access interval ac_intv is longer than the preset interval th_intv. The cold page may be represented by a logical value of "0."

Figure 6:
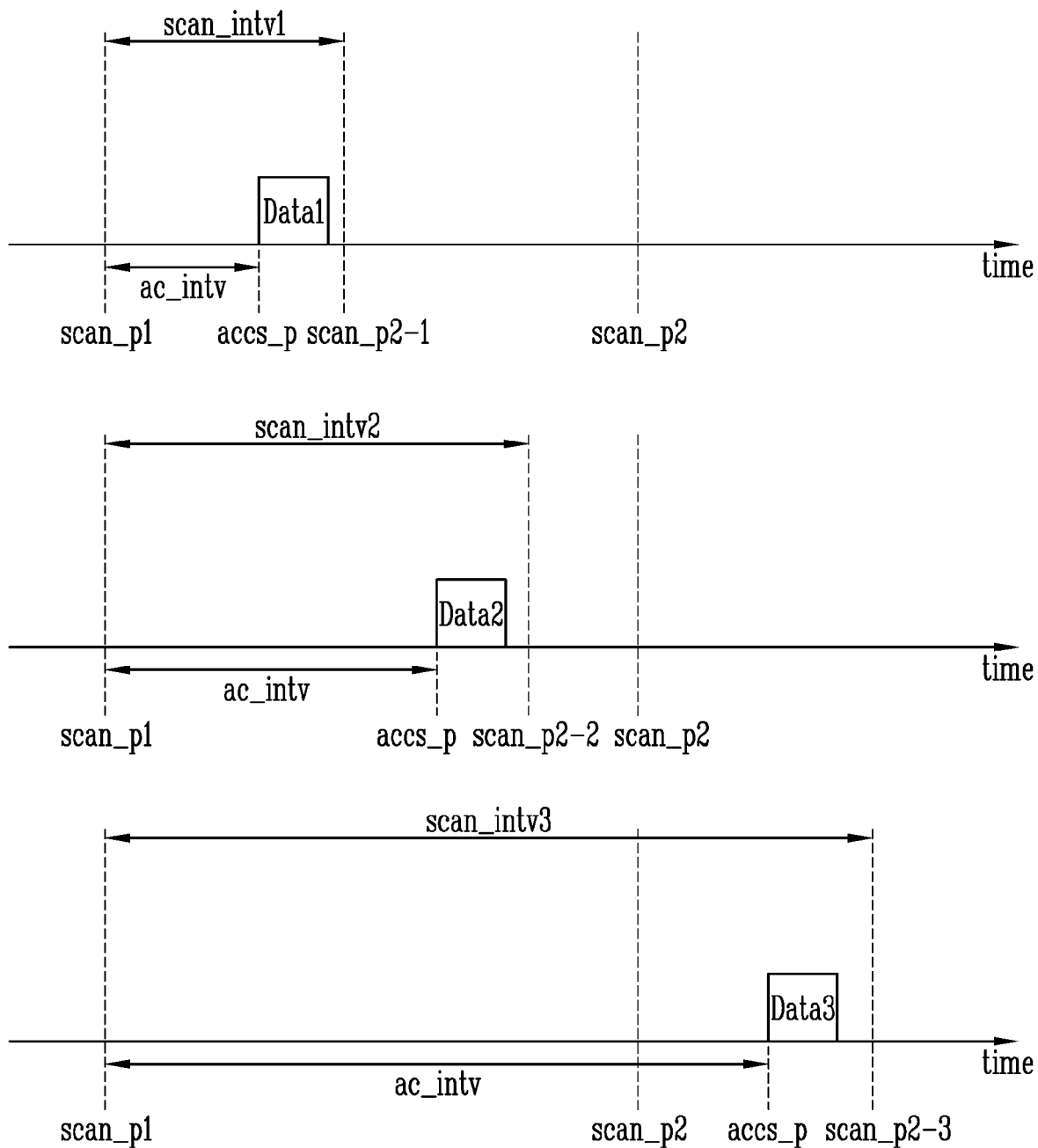
FIG. 6 is a diagram illustrating an operation of setting scanning points depending on the access intervals for a plurality of pages according to an embodiment of the present disclosure.

FIG. 6 is a diagram illustrating an operation of setting scanning points depending on the access intervals for a plurality of pages according to an embodiment of the present disclosure.

In FIG. 6, the horizontal axis of each graph indicates time.

In FIG. 6, repeated descriptions of configurations identical to those in the graphs of FIG. 3 will be omitted.

Referring to FIG. 6, the scanning period controller 210 may change a scanning interval depending on the access interval for each of a plurality of pages. More specifically, the scanning period controller 210 may change the time point at which a second scanning point is to be set depending on the access interval for each of the plurality of pages.

In the graph in the upper portion of FIG. 6, an access interval ac_intv for first data Data1 is shorter than a preset interval th_intv, and thus the attribute of a page in which the first data Data1 is stored may be determined to indicate a hot page. Further, because access to the first data Data1 was requested before the time point at which a second scanning point scan_p2 is to be set, the scanning period controller 210 may change the time point at which the second scanning point scan_p2 is to be set to a 2-1-th scanning point scan_p2-1. That is, the scanning period controller 210 sets the scanning point for the page in which the first data Data1 is stored to the 2-1-th scanning point scan_p2-1, and thus the scanning interval may be set to be shorter than that of the graph in the upper portion of FIG. 3.

As in the case of the graph in the middle portion of FIG. 3, the graph in the middle portion of FIG. 6 shows that an access interval ac_intv for second data Data2 is longer than the preset interval th_intv, and thus the attribute of a page in which the second data Data2 is stored may be determined to indicate a cold page. Further, because access to the second data Data2 was requested before the time point at which a second scanning point scan_p2 is to be set, the scanning period controller 210 may change the time point at which the second scanning point scan_p2 is to be set to a 2-2-th scanning point scan_p2-2. That is, the scanning period controller 210 sets the scanning point for the page in which the second data Data2 is stored to the 2-2-th scanning point scan_p2-2, and thus the scanning interval may be set to be shorter than that of the graph in the middle portion of FIG. 3.

As in the case of the graph in the lower portion of FIG. 3, the graph in the lower portion of FIG. 6 shows that an access interval ac_intv for third data Data3 is longer than the preset interval th_intv, and thus the attribute of a page in which the third data Data3 is stored may be determined to indicate a cold page. Further, because access to the third data Data3 is requested after the time point at which a second scanning point scan_p2 is to be set, the scanning period controller 210 may change the time point at which the second scanning point scan_p2 is to be set to a 2-3-th scanning point scan_p2-3. That is, the scanning period controller 210 sets the scanning point for the page in which the third data Data3 is stored to the 2-3-th scanning point scan_p2-3, and thus the scanning interval may be set to be longer than that of the graph in the lower portion of FIG. 3.

The scanning period controller 210 may change the time point at which the second scanning point is to be set depending on the time point at which access to data is requested. Accordingly, the scanning period controller 210 may change the scanning interval depending on the access interval for a page in which data is stored. In an embodiment, the scanning period controller 210 may set the scanning interval in proportion to the data access interval. In detail, the scanning period controller 210 may set a shorter scanning interval for a page having a shorter access interval, among the plurality of pages. Further, the scanning period controller 210 may set a longer scanning interval for a page having a longer access interval, among the plurality of pages.

FIG. 7 is a diagram illustrating an operation of changing scanning intervals depending on the access intervals for a plurality of pages according to an embodiment of the present disclosure.

A description of FIG. 7 will be made with reference to FIGS. 4 and 5.

Referring to FIG. 7, the page information storage 211 illustrated in FIG. 2 may store information pg_inf about pages corresponding to requests Req from a host, an access bit ps_bit for a plurality of pages, first scanning points scan_p1 for the plurality of pages, second scanning points scan_p2 for the plurality of pages, scanning intervals scan_intv, and information about times accs_p at which access to the data stored in the plurality of pages is requested.

The attribute determiner 220 may provide information about access intervals ac_intv for the plurality of pages to the scanning period controller 210. The scanning period controller 210 may change the time points at which the second scanning points scan_p2 are to be set based on the information about the access intervals ac_intv.

First, the case where access to data stored in a first page is requested in the table shown in FIG. 7 is described by way of example. The attribute determiner 220 may determine the attribute of the first page to indicate a hot page, as described above with reference to FIG. 5. Thereafter, the information about the access interval ac_intv for the first page may be provided to the scanning period controller 210. For example, the access interval ac_intv for the first page may be 2. In the scanning period controller 210, the time point at which the second scanning point is to be set may be 13, as described above with reference to FIG. 4. Further, the scanning interval to be set by the scanning period controller 210 may be 10. In this case, because the access interval ac_intv for the first page is shorter than the scanning interval to be set by the scanning period controller 210, the scanning period controller 210 may change the scanning interval scan_intv for the first page. For example, the scanning period controller 210 may change the time point at which the second scanning point for the first page is to be set from 13 to 7. The scanning period controller 210 may change the scanning interval scan_intv for the first page to 4. Thereafter, the scanning period controller 210 may set scanning points for the first page depending on the changed scanning interval.

Next, the case where access to data stored in a second page is requested in a table shown in FIG. 7 is described by way of example. The attribute determiner 220 may determine the attribute of the second page to indicate a cold page, as described above with reference to FIG. 5. Thereafter, the information about the access interval ac_intv for the second page may be provided to the scanning period controller 210. For example, the access interval ac_intv for the second page may be 6. In the scanning period controller 210, the time point at which the second scanning point is to be set may be 13, as described above with reference to FIG. 4. Further, the scanning interval to be set by the scanning period controller 210 may be 10. In this case, because the access interval ac_intv for the second page is shorter than the scanning interval to be set by the scanning period controller 210, the scanning period controller 210 may change the scanning interval scan_intv for the second page. For example, the scanning period controller 210 may change the time point at which the second scanning point for the second page is to be set from 13 to 11. The scanning period controller 210 may change the scanning interval scan_intv for the second page to 8. Thereafter, the scanning period controller 210 may set scanning points for the second page depending on the changed scanning interval. Since the second page is a cold page, but the access interval ac_intv for the second page is shorter than a preset scanning interval, the scanning interval for the second page may be set to be shorter. In an embodiment, the scanning period controller 210 may set a shorter scanning interval for a page, for which an access interval is longer than the preset interval th_intv and is shorter than the scanning interval to be set. In an embodiment, the scanning period controller 210 may maintain a set scanning interval scan_intv for a page, for which the access interval ac_intv is longer than the preset interval th_intv and is shorter than the scanning interval scan_intv to be set.

Next, the case where access to data stored in a third page is requested in a table shown in FIG. 7 is described by way of example. The attribute determiner 220 may determine the attribute of the third page to indicate a cold page, as described above with reference to FIG. 5. Thereafter, the information about the access interval ac_intv for the third page may be provided to the scanning period controller 210. For example, the access interval ac_intv for the third page may be 15. In the scanning period controller 210, the time point at which the second scanning point is to be set may be 13, as described above with reference to FIG. 4. Further, the scanning interval to be set by the scanning period controller 210 may be 10. In this case, because the access interval ac_intv for the third page is longer than the scanning interval to be set by the scanning period controller 210, the scanning period controller 210 may change the scanning interval scan_intv for the third page. For example, the scanning period controller 210 may change the time point at which the second scanning point for the third page is to be set from 13 to 16. The scanning period controller 210 may change the scanning interval scan_intv for the third page to 13. Thereafter, the scanning period controller 210 may set scanning points for the third page depending on the changed scanning interval.

The scanning period controller 210 may change the time points at which second scanning points for the plurality of pages are to be set depending on the access intervals for the plurality of pages. Further, the scanning period controller 210 may change the scanning intervals for the plurality of pages depending on the access intervals for the plurality of pages. In detail, the lengths of the scanning intervals for the plurality of pages may be proportional to the lengths of access intervals for the plurality of pages. For example, the scanning intervals for pages having the attribute of a hot page, among the plurality of pages, may be shorter than the scanning intervals for pages having the attribute of a cold page.

Figure 8:
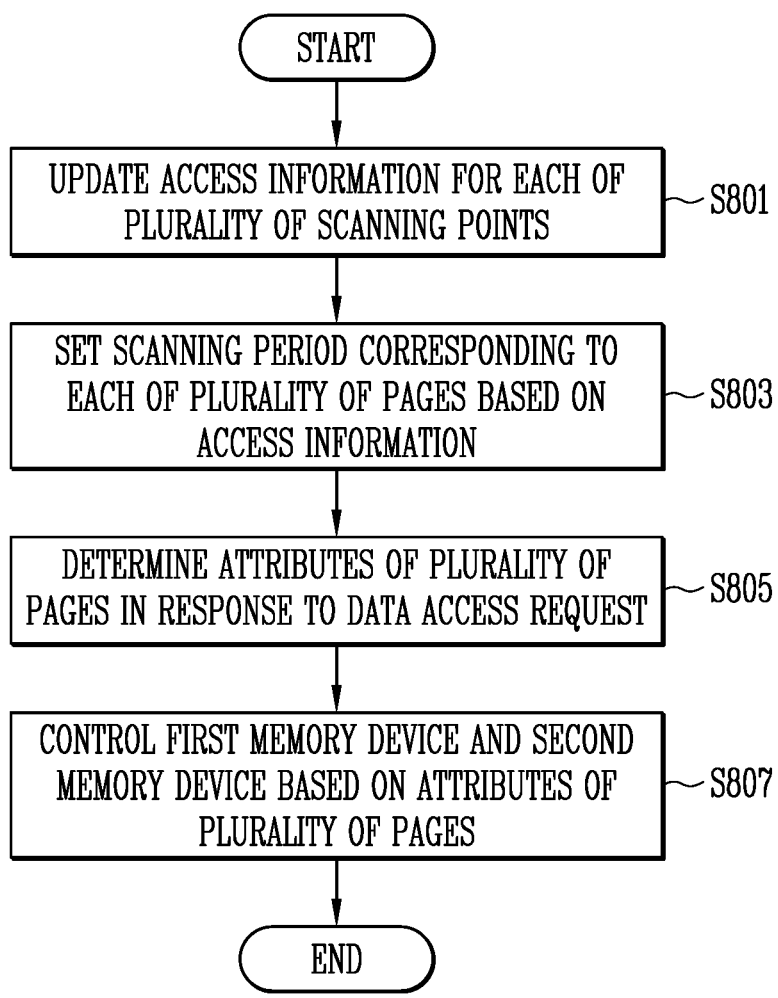
FIG. 8 is a flowchart illustrating a method of operating a memory system according to an embodiment of the present disclosure.

FIG. 8 is a flowchart illustrating a method of operating a memory system according to an embodiment of the present disclosure.

Referring to FIG. 8, at operation S801, the memory system 50 may update access information for each of a plurality of scanning points. The scanning points may be time points at which access information indicating whether a plurality of pages are accessed is reset.

At operation S803, the memory system 50 may set a scanning interval corresponding to each of the plurality of pages based on the access information. In an embodiment, the memory system 50 may set the length of the scanning interval in consideration of the length of an access interval that is the interval from a first scanning point at which the access information is reset to the time at which access to data stored in each of the plurality of pages is requested.

At operation S805, the memory system 50 may determine the attributes of the plurality of pages in response to the data access request.

At operation S807, the memory system 50 may control a first memory device and a second memory device based on the attributes of the plurality of pages. In an embodiment, pages having the attribute of a hot page may be stored in the second memory device. In an embodiment, pages having the attribute of a cold page may be stored in the first memory device.

Figure 9:
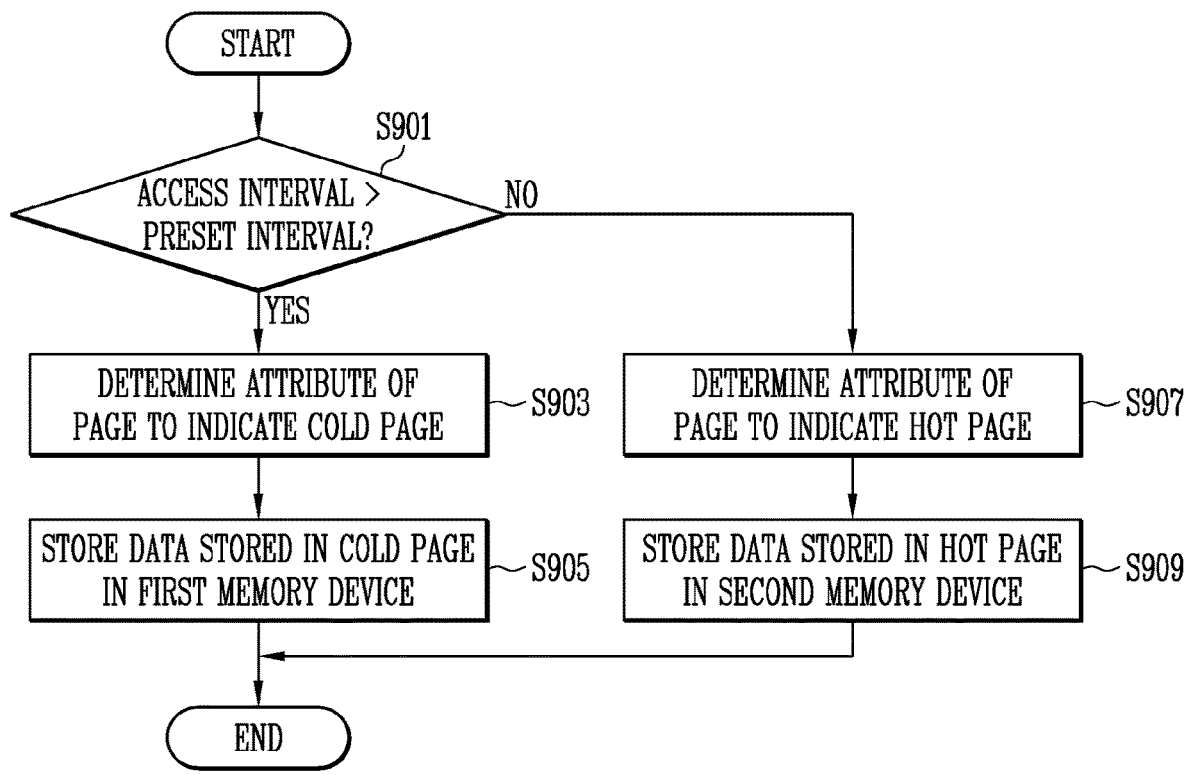
FIG. 9 is a flowchart illustrating a method of determining the attributes of a plurality of pages depending on the access intervals according to an embodiment of the present disclosure.

FIG. 9 is a flowchart illustrating a method of determining the attributes of a plurality of pages depending on the access intervals according to an embodiment of the present disclosure.

Referring to FIG. 9, at operation S901, the memory system 50 may compare an access interval with a preset interval to determine whether the access interval is longer than the preset interval. In an embodiment, the access interval may be an interval from the time at which a first scanning point for each of a plurality of pages is set to the time at which access to data stored in the corresponding page, among the plurality of pages, is requested. When the access interval is longer than the preset interval, operation S903 may be performed. On the other hand, when the access interval is shorter than the preset interval, operation S907 may be performed.

At operation S903, the memory system 50 may determine the attribute of the page in which the data is stored to indicate a cold page when the access interval is longer than the preset interval.

At operation S905, the memory system 50 may store data, stored in the cold page, in the first memory device.

At operation S907, the memory system 50 may determine the attribute of the page in which the data is stored to indicate a hot page when the access interval is shorter than the preset interval.

At operation S909, the memory system 50 may store data, stored in the hot page, in the second memory device.

Figure 10:
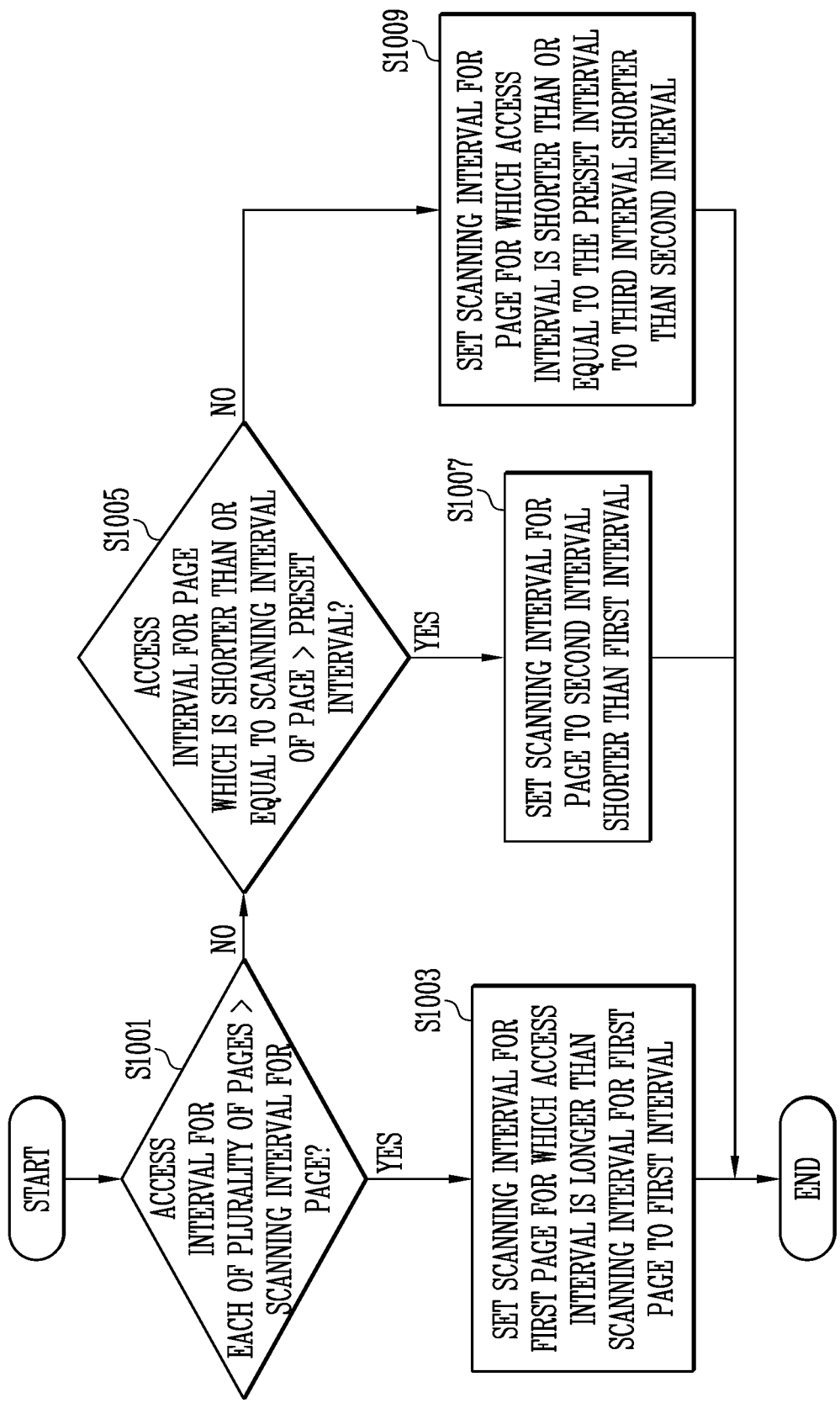
FIG. 10 is a flowchart illustrating a method of setting scanning intervals depending on the access intervals for a plurality of pages according to an embodiment of the present disclosure.

FIG. 10 is a flowchart illustrating a method of setting scanning intervals depending on the access intervals for a plurality of pages according to an embodiment of the present disclosure.

Referring to FIG. 10, at operation S1001, the memory system 50 may compare the access interval for each of the plurality of pages with the scanning interval for the page to determine whether the access interval for the page is longer than the scanning interval for the page. When the access interval for the page is longer than the scanning interval for the page, operation S1003 may be performed. On the other hand, when the access interval for the page is shorter than the scanning interval for the page, operation S1005 may be performed.

At operation S1003, among the plurality of pages, the memory system 50 may set, to a first interval, the scanning interval for a first page for which the access interval is longer than the scanning interval for the first page. In an embodiment, the attribute of the first page may indicate a cold page.

At operation S1005, the memory system 50 may compare the access interval for the page, which is shorter than or equal to the scanning interval of the page, with the preset interval. When the access interval for the page is longer than the preset interval, operation S1007 may be performed. On the other hand, when the access interval for the page is shorter than the preset interval, operation S1009 may be performed.

At operation S1007, the memory system 50 may set the scanning interval for the page to a second interval shorter than the first interval. In an embodiment, the attribute of the page may indicate a cold page.

At operation S1009, the memory system 50 may set the scanning interval for the page, for which the access interval is shorter than or equal to the preset interval, to a third interval shorter than the second interval. In an embodiment, the attribute of the page may indicate a hot page.

Figure 11:
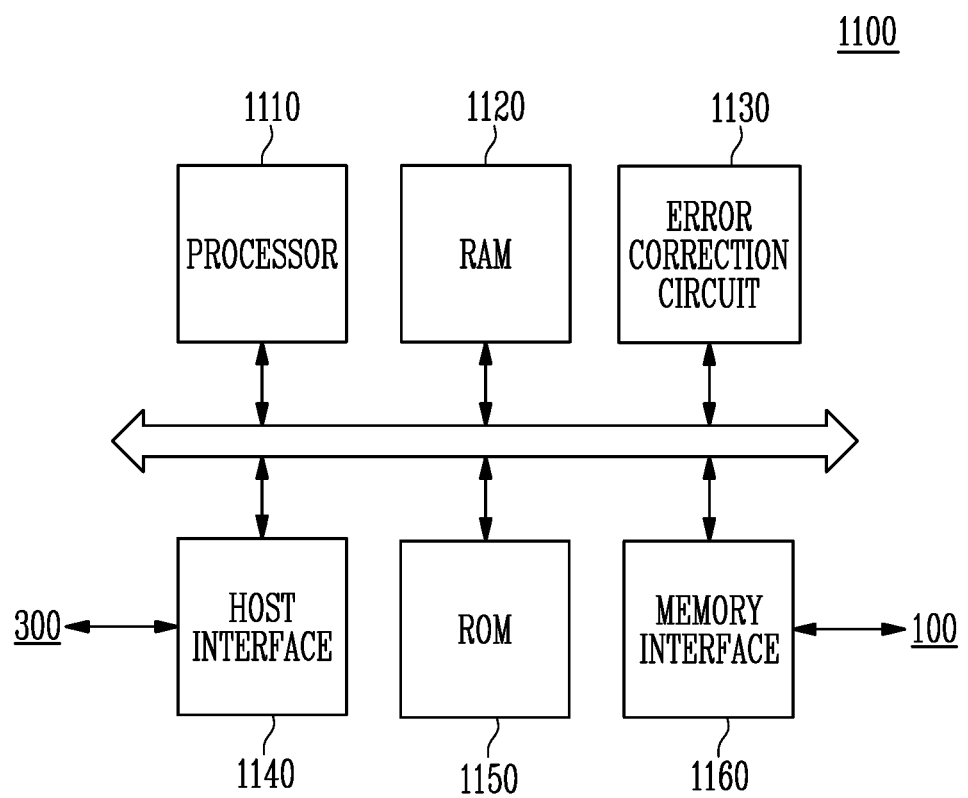
FIG. 11 is a diagram illustrating the memory controller of FIG. 1 according to an embodiment of the present disclosure.

FIG. 11 is a diagram illustrating the memory controller of FIG. 1 according to an embodiment of the present disclosure.

The memory controller 1100 of FIG. 11 may be the memory controller 200 of FIG. 1.

Referring to FIG. 11, the memory controller 1100 may include a processor 1110, a random access memory (RAM) 1120, an error correction circuit 1130, a host interface 1140, a read only memory (ROM) 1150, and a memory interface 1160.

The processor 1110 may control the overall operation of the memory controller 1100. In an embodiment, the processor 1110 may set the lengths of scanning intervals for a plurality of pages based on the lengths of access intervals for the plurality of pages.

The RAM 1120 may be used as a buffer memory, a cache memory or a working memory of the memory controller 1100. In an embodiment, the RAM 1120 may store information about the time at which data is stored in a first memory device or a second memory device, information about the time at which access to data is requested, and information about the time at which access to data is re-requested.

The error correction circuit 1130 may perform error correction. The error correction circuit 1130 may perform error correction code (ECC) encoding based on data to be written to a semiconductor memory 100 through the memory interface 1160. The ECC-encoded data may be transferred to the semiconductor memory 100 through the memory interface 1160. The error correction circuit 1130 may perform error correction decoding (ECC decoding) on data received from the semiconductor memory 100 through the memory interface 1160. In an embodiment, the error correction circuit 1130 may be included, as a component of the memory interface 1160, in the memory interface 1160.

The ROM 1150 may store various types of information required for the operation of the memory controller 1100 in the form of firmware.

The memory controller 1100 may communicate with an external device (e.g., a host 300, an application processor, or the like) through the host interface 1140. The memory controller 1100 may be provided with data through the host interface 1140.

The memory controller 1100 may communicate with the semiconductor memory 100 through the memory interface 1160. The memory controller 1100 may transmit a command, an address, a control signal, etc. to the semiconductor memory 100 and receive data from the semiconductor memory 100 through the memory interface 1160. In an example, the memory interface 1160 may include a NAND interface.

Figure 12:
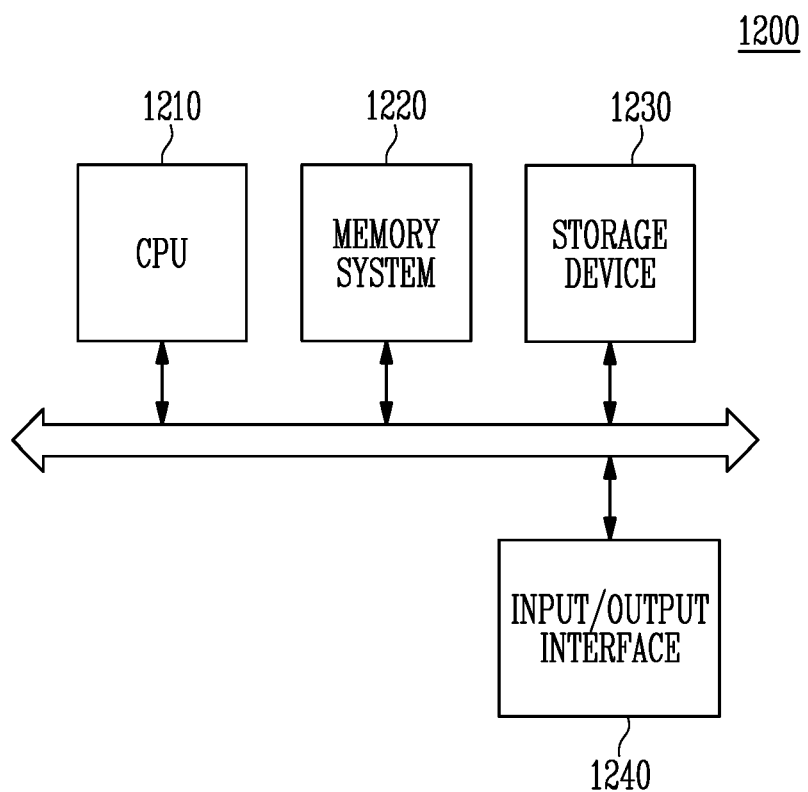
FIG. 12 is a diagram illustrating a computer system to which a memory system according to an embodiment of the present disclosure is applied.

FIG. 12 is a diagram illustrating a computer system to which a memory system according to an embodiment of the present disclosure is applied.

Referring to FIG. 12, a computer system 1200 may include a central processing unit (CPU) 1210, a memory system 1220, a storage device 1230, and an input/output interface 1240, which are coupled to a system bus.

The CPU 1210 may be a processor for processing computations performed by the computer system 1200. The CPU 1210 may control the overall operation of the computer system 1200. The CPU 1210 may access the memory system 1220. The CPU 1210 may store data in the memory system 1220, or may process or execute data stored in the memory system 1220.

The memory system 1220 may temporarily store data. The memory system 1220 may be configured in the same manner as the memory system 50 illustrated in FIG. 1. For example, both a first memory device 140 and a second memory device 150 included in the memory system 1220 may be implemented as volatile memory devices. In an embodiment, the memory system 1220 may be implemented as a main memory device of the CPU 1210. The memory system 1220 may store file system-format data or store an operating system program. The operating system program executed by the CPU 1210 may be read from the storage device 1230, and may be stored in the memory system 1220.

The storage device 1230 may be implemented as one of a hard disk drive (HDD) and a solid state drive (SSD). The storage device 1230 may be a device which stores data for a long period of time. The storage device 1230 may be a nonvolatile memory device. The storage device 1230 may store an operating system (OS) and an application program (AP).

The input/output interface 1240 may include an input interface and an output interface. The input interface may be coupled to an external input device. The external input device may include a keyboard, a mouse, a microphone or a scanner. A user may input a command, data, and information to the computer system 200 through the external input device.

The output interface may be coupled to an external output device. The external output device may include a monitor, a printer or a speaker. The output interface may provide the results of processing the command, data or information that is input by the user through the external input device to the external output device.

In accordance with the present disclosure, there are provided a memory controller that is capable of improving a hot page detection speed and a memory system including the memory controller.

The embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A memory controller for controlling heterogeneous first and second memory devices, each configured to include a plurality of pages, the memory controller comprising:
   a scanning period controller configured to reset, whenever scanning points sequentially arrive, access information indicating whether each of the plurality of pages is accessed, and set a scanning interval for each of the pages between the scanning points for the page based on an attribute of the page;
   an attribute determiner configured to determine, as a hot page or a cold page, the attribute of each of the pages based on an access interval for the page from a first scanning point among the scanning points for the page to a time at which access to data stored in the page is requested; and
   a memory allocator configured to control the first memory device and the second memory device based on the attributes of the pages.

2. The memory controller according to claim 1, wherein the scanning period controller is further configured to set, based on the attributes of the respective pages, second scanning points respectively corresponding to the plurality of pages such that the scanning interval for a hot page is shorter than the scanning interval for the cold page.

3. The memory controller according to claim 2, wherein the scanning period controller is configured to set, when the time at which the access to data stored in the page is requested appears after the scanning interval for the page, the second scanning point for the page after the time at which the access to data stored in the page is requested.

4. The memory controller according to claim 2, wherein the scanning period controller is configured to set, when the access to data stored in the page is requested before the scanning interval for the page elapses from the first scanning point for the page, the second scanning point for the page after the scanning interval for the page has elapsed from the first scanning point for the page.

5. The memory controller according to claim 4, wherein the scanning period controller is configured to set, when the access to data stored in the page is not requested until a first scanning interval for the page elapses from the first scanning point for the page, the scanning interval for the page to a second scanning interval longer than the first scanning interval.

6. The memory controller according to claim 1, wherein the attribute determiner determines the attribute of the page as the hot page, for which the access interval is shorter than or equal to a preset interval, and determines the attribute of the page as the cold page, for which the access interval is longer than the preset interval.

7. The memory controller according to claim 6, wherein the scanning period controller sets the scanning interval for the page to be shorter as the access interval for the page becomes shorter.

8. The memory controller according to claim 7, wherein the scanning period controller sets the scanning interval for the page to be longer as the access interval for the page becomes longer.

9. The memory controller according to claim 8, wherein the memory allocator controls the first memory device to store therein data of the cold page and the second memory device to store therein data of the hot page.

10. The memory controller according to claim 9, wherein:
    the scanning period controller is further configured to sequentially set the first scanning point for each of the plurality of page, and
    the scanning period controller sets the scanning interval depending on an access interval for each of the plurality of page.

11. A method of operating a memory controller, comprising:
    updating access information at each of a plurality of scanning points, the access information indicating whether each of a plurality of pages is accessed in each of a heterogeneous first memory device and a second memory device;
    setting a scanning interval for each of the pages between the plurality of scanning points for the page based on the access information for the page;
    determining an attribute of each of the plurality of pages in response to a request to access data stored in the page; and
    controlling the first memory device and the second memory device based on the attributes of the plurality of pages.

12. The method according to claim 11, wherein the determining the attribute comprises determining the attribute of the page as a hot page or a cold page based on an access interval of the page from a first scanning point among the scanning points for the page to a time at which access to data stored in the page is requested.

13. The method according to claim 12, wherein the setting the scanning interval comprises setting a second scanning point for the page such that the scanning interval for the hot page is shorter than the scanning interval for the cold page.

14. The method according to claim 13, wherein the determining the attribute comprises:
    determining the attribute of the page as the hot page, for which the access interval is shorter than or equal to a preset interval; and
    determining the attribute of the page as the cold page, for which the access interval is longer than the preset interval.

15. The method according to claim 14, wherein the setting the scanning interval further comprises setting, when the access to data stored in the page is not requested until a first scanning interval for the page elapses from the first scanning point for the page, the scanning interval for the page to a second scanning interval longer than the first scanning interval.

16. The method according to claim 14, wherein the setting the scanning interval further comprises setting a length of the scanning interval in proportion to a length of the access interval.

17. A memory system, comprising:
a first memory;
a second memory having an operation speed higher than an operation speed of the first memory and having a type different from a type of the first memory; and
a memory controller configured to
   determine an attribute of each of a plurality of pages as a hot page or a cold page, included in each of the first memory and the second memory based on an access interval for the page from a time at which a scanning point is set for the page to a time at which access to data stored in the page is requested,
   set a length of a scanning interval for the page from the scanning point for the page to a subsequent scanning point for the page depending on a length of the access interval for the page, and
   control the first memory and the second memory to store data of the plurality of pages in the first memory or the second memory depending on the attributes of the plurality of pages.

18. The memory system according to claim 17, wherein the memory controller sets the length of the scanning interval to a first length, for the page for which the access interval is longer than the scanning interval, and sets the length of the scanning interval for the page to a second length shorter than the first length, for which the access interval is shorter than or equal to the scanning interval.

19. The memory system according to claim 18, wherein the memory controller sets the scanning interval for the page for which the access interval is shorter than a preset interval to a third length shorter than the second length, which is shorter than the scanning interval.

20. The memory system according to claim 19, wherein the memory controller determines the page for which the access interval is shorter than the preset interval as the hot page, and determines the page for which the access interval is longer than the preset interval, as the cold page.

* * * * *